No. 844,360. PATENTED FEB. 19, 1907.
R. HUFF.
PUMP.
APPLICATION FILED SEPT. 18, 1905.
2 SHEETS—SHEET 1.
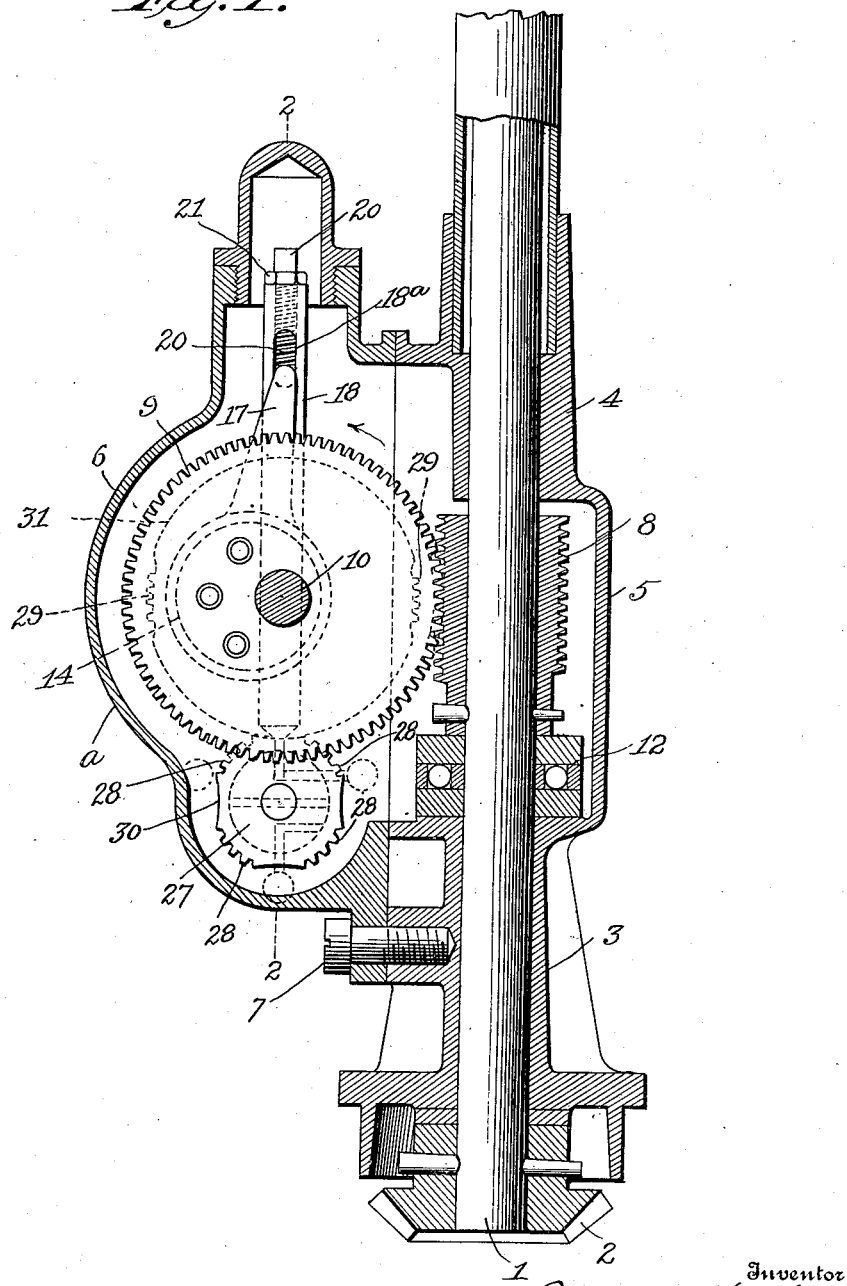

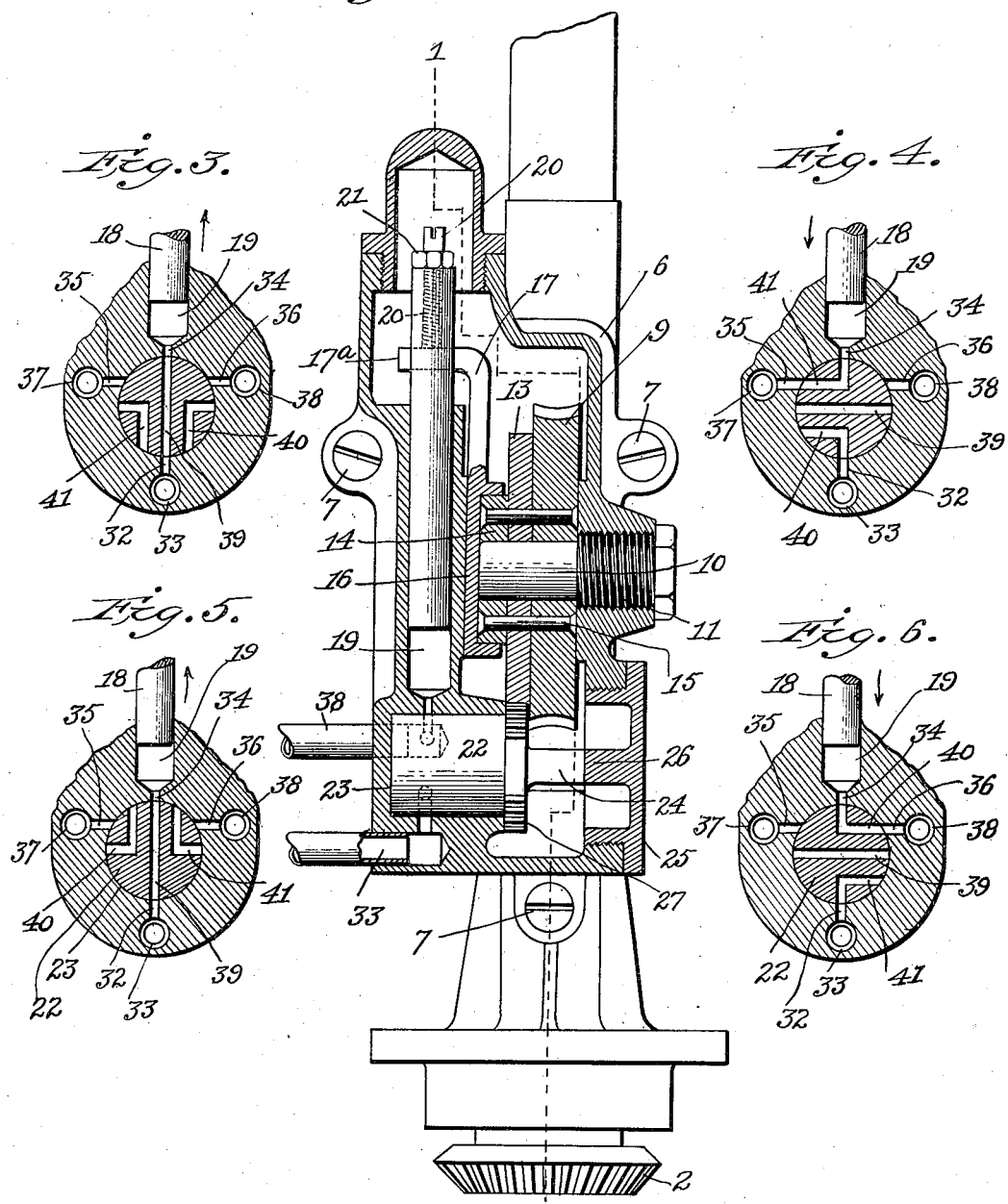

UNITED STATES PATENT OFFICE.

RUSSELL HUFF, OF DETROIT, MICHIGAN.

PUMP.

No. 844,360.    Specification of Letters Patent.    Patented Feb. 19, 1907.

Application filed September 18, 1905. Serial No. 278,978.

*To all whom it may concern:*

Be it known that I, RUSSELL HUFF, a citizen of the United States, residing at Detroit, in the county of Wayne and State of Michigan, have invented certain new and useful Improvements in Pumps, of which the following is a specification.

The purpose of this invention is to provide a pump which will take its supply of fluid from one source and distribute the fluid in equal quantities to different reservoirs or places where it may be required.

The invention is particularly designed for use in connection with motor-driven vehicles for the purpose of returning the oil with which the machinery has been lubricated to oil cups or reservoirs located at different points; but the pump may be used for various other purposes.

By means of my improvements the supply of oil is evenly distributed regardless of differences in height of the oil-receptacles, an equal amount of oil being positively forced into each of the delivery-pipes leading to such receptacles.

In the accompanying drawings, which illustrate the invention, Figure 1 is a sectional view through the apparatus on the line 1 1 of Fig. 2. Fig. 2 is a section on the line 2 2 of Fig. 1. Figs. 3, 4, 5, and 6 are detail sectional views taken through the distributing-valve in line with its various ports, showing, respectively, the successive positions of the valve during one complete cycle of operation.

Referring to the drawings, 1 indicates a driving-shaft provided, as shown, with a beveled pinion 2, by means of which the shaft may be driven directly or indirectly from the motor or engine. This shaft is rotatable within bearings 3 and 4 in the base 5 of a suitable casing or housing $a$, which constitutes the frame of the pump and incloses the working mechanism. This frame, as shown, comprises the base 5 and the part 6, which is detachably connected therewith by screws 7, as shown, so that the working parts may be readily inserted, removed, or inspected. Upon the shaft 1 is secured a worm 8, which engages a worm-wheel 9, journaled upon a fixed stud 10, which latter is secured within a threaded opening 11 in the side of the hollow frame or casing and projects into the interior of the casing, as shown in Fig. 2. The worm 8 drives the worm-wheel in the direction indicated by the arrow, Fig. 1, and a suitable step-bearing 12 is provided at the end of the bearing 3, as shown, to take up the thrust of the driving-shaft. A mutilated gear 13 and an eccentric 14 are also journaled upon the stud 10, and the eccentric, mutilated gear, and worm-wheel are secured together by suitable means, such as the bolts or rivets 15, so that these three members will rotate in unison.

An eccentric plate 16 fits over the face and periphery of the eccentric, and an arm 17, connected to said plate, has a lateral extension $17^a$, which projects through an opening $18^a$ in a pump-plunger 18. This plunger, as shown, is movable longitudinally within a pump cylinder or barrel 19, which is formed in the pump frame or housing. The opening $3^a$ is elongated, as shown, in order to permit of lost motion between the arm $17^a$ and the plunger when it is desired to shorten the stroke of the latter, and this lost motion may be regulated or entirely taken up by an adjusting-screw 20, which extends longitudinally inward from the outer end of the plunger and forms a stop for the arm $17^a$. The adjusting-screw is provided with a lock-nut 21. In the drawings the adjusting-screw is shown in its innermost position, in which position there is no lost motion between the parts and the plunger makes its full stroke.

A cylindrical valve 22, having its axis parallel with the axis of the stud 10, fits closely within a cylindrical opening or socket 23, located adjacent to the inner end of the pump-cylinder. This valve has a stem 24 projecting from one end, and the valve is held within the socket by means of a cap 25, threaded into the side of the pump frame or casing and having a central projection 26, which abuts against the end of the valve-stem. A mutilated pinion 27 is secured upon the valve-stem, and this pinion has teeth 28 at four points arranged to mesh with the teeth 29 upon the large mutilated gear 13. Between the sets of teeth 28 on the pinion the latter has curved surfaces or lands 30, which are adapted to engage the smooth surface 31 of the large gear during the intervals when the teeth of the gear and pinion are not engaged, so that the pinion is locked against rotation during such intervals. This arrangement of mutilated interlocking gearing is in common use and well known and does not require an extended description or illustration. The large gear 13 has a few teeth at two points only, and these are diametrically opposite one another the arrangement being such that at each half-revolution of the large mutilated gear the mutilated pinion and the valve which is operated thereby will be turned through an angle of ninety degrees and then locked. The gears are so arranged that their teeth will engage and the pinion and the valve will be moved while the pump-plunger is changing its direction of movement and practically stopped after the completion of each stroke. As the gear 13 is much larger than the pinion, this shifting of the valve takes place quickly at the time when there is, practically speaking, no longitudinal movement of the pump-plunger.

The valve cylinder or socket 23 has an inlet-port 32 connecting with a supply-pipe 33, and it has a diametrically opposite port 34 connecting the interior of the pump-cylinder with the valve cylinder or socket. Outlet-ports 35 and 36 extend from the valve-socket at each side of the port 34 to a pair of delivery-pipes 37 and 38, respectively.

The valve 22 has a passage-way 39 extending diametrically through it and arranged to register simultaneously with the ports 32 and 34 at each half-revolution of the valve. The valve also has two passage-ways 40 and 41, as shown, extending inwardly toward the center of the valve and thence laterally in the same direction parallel with the passage-way 39. In one position of the valve the passage-way 41 is arranged to connect the pump-cylinder port 34 with the delivery-port 35, as shown in Fig. 4, and when the valve is turned through an angle of one hundred and eighty degrees the passage-way 40 connects the port 34 with the port 36, as shown in Fig. 6.

In operation the pump-piston is driven continuously by the main shaft 1 and the intermediate worm-gearing, eccentric, and connecting-rod, and the valve 22 and the gearing for driving the same are set with relation to one another so that the passage-way 39 will connect the pump-cylinder port 34 with the inlet-port 32 at the commencement of each suction-stroke. Fluid will therefore be drawn into the pump-cylinder from the supply-pipe at each suction-stroke. While the eccentric is passing over the dead-center and the pump-piston is changing from the suction to the succeeding compression stroke the mutilated gear and pinion intermesh and the valve is given a quarter-revolution, thus bringing either the passage-way 40 or the passage-way 41 in register with the pump-cylinder port 34 and one of the delivery-ports, so that the plunger on its inward stroke will force the liquid out through one of the delivery-pipes. The cycle of operations will be plain from an inspection of Figs. 3 to 6, inclusive. In Fig. 3 the pump-plunger, as indicated by the arrow, is supposed to be moving on the backward or suction stroke, and the fluid from the supply-pipe is free to flow into the cylinder through the passage-way 39, which registers with the ports 32 and 34. At the completion of the suction-stroke the valve is shifted through an angle of ninety degrees into the position shown in Fig. 4, and the port 34 is then connected to the delivery-port 35 through the passage-way 41, so that as the plunger moves forward, as indicated by the arrow, the fluid will be forced from the pump-cylinder into the delivery-pipe 37. At the completion of this compression-stroke of the plunger the valve is again shifted through an angle of ninety degrees, again bringing the through passage-way 39 in line with the ports 32 and 34, as shown in Fig. 5, so that a further supply of fluid may be drawn into the pump-cylinder when the plunger moves backward or outward, as indicated by the arrow in said figure. At the completion of this suction-stroke the valve again shifts through an angle of ninety degrees, and the passage-way 40 then connects the port 34 with the delivery-port 36, as shown in Fig. 6, so that on the succeeding compression-stroke of the plunger the fluid will be delivered from the pump-cylinder into the delivery-pipe 38. It will thus be seen that fluid will be delivered alternately into the delivery-pipes 37 38 during the alternate compression-strokes of the plunger and that at each suction-stroke the valve will connect the pump-cylinder with the common source of supply—to wit, the supply-pipe 33. It will also be noted that there is no opportunity for the fluid to pass directly from one port to another, as the valve closes all of the ports except the ones which are in use at any one time.

Having thus described my invention, what I claim as new, and desire to secure by Letters Patent, is—

1. In a fluid-distributing pump having an inlet-port and a plurality of delivery-ports, the combination with the pump-cylinder, the plunger therein and means for reciprocating the plunger, of a valve having a passage-way adapted to connect the inlet-port with the pump-cylinder, and passage-ways adapted to connect the delivery-ports successively with the pump-cylinder, and means for intermittently operating said valve to connect the inlet-port with the pump-cylinder during the suction-strokes of the plunger and to connect said delivery-ports successively to the pump-cylinder during the compression-strokes of the plunger.

2. In a fluid-distributing pump having an inlet-port and a plurality of delivery-ports, the combination with the pump-cylinder, the plunger therein and means for reciprocating the plunger, of a rotary valve and intermittently-operating means for giving the same a partial rotation at the completion of, and holding the same stationary during, each stroke of the plunger, said valve having a passage-way arranged to connect the inlet-port with the pump-cylinder during each suction-stroke, and having passage-ways arranged to connect the delivery-ports successively with the pump-cylinder during successive compression-strokes of the plunger.

3. In a fluid-distributing pump having an inlet-port and a plurality of delivery-ports, the combination with the pump-cylinder, the plunger therein and means for reciprocating the plunger, of a rotary valve and means for giving the same alternately a partial rotation and a rest for each stroke of the plunger, said valve having a passage-way extending diametrically therethrough adapted to connect the inlet-port with the pump-cylinder during each suction-stroke and having independent passage-ways arranged to connect the delivery-ports successively with the pump-cylinder during successive compression-strokes of the plunger.

4. In a fluid-distributing pump having an inlet-port and a plurality of delivery-ports, the combination with the pump-cylinder, the plunger therein and means for reciprocating the plunger, of a valve cylinder or socket adjacent to the pump-cylinder and having a port communicating therewith, said valve-cylinder also having an inlet-port and a plurality of outlet-ports, a valve within said socket having an inlet passage-way extending diametrically therethrough adapted to connect the inlet-port with the pump-cylinder port and having delivery passage-ways entering the periphery of the valve at points midway between the ends of said inlet passage-way, each adapted to connect the pump-cylinder port with one of said delivery-ports, and means for giving said valve a partial turn at the completion of each movement of the plunger.

5. In a fluid-distributing pump, having an inlet-port and a plurality of delivery-ports, the combination with the pump-cylinder, the plunger therein and the rotary valve having passage-ways adapted to connect said inlet-port and one of the delivery-ports alternately to the pump-cylinder in successive positions of the valve, of means for partially rotating said valve at the completion of each stroke of the plunger and for holding said valve stationary during the operative movements of the plunger.

6. In a fluid-distributing pump, having an inlet-port and a plurality of delivery-ports, the combination with the pump-cylinder, the plunger therein and the rotary valve having passage-ways adapted to connect said inlet-port and one of the delivery-ports alternately to the pump-cylinder in successive positions of the valve, of means for partially rotating said valve at the completion of each stroke of the plunger comprising a mutilated pinion connected to the valve, a mutilated gear adapted to alternately mesh and interlock with said pinion, and means for operating said gear so that its teeth will mesh with the teeth on the pinion at the completion of each plunger-stroke.

7. In a pump of the character described, the combination with the pump-cylinder, the reciprocating plunger and a rotary valve for controlling the flow of liquid to and from the pump, of a mutilated gear and an eccentric arranged to rotate in unison, means for driving said gear and eccentric, a mutilated pinion connected to the valve and arranged to engage said gear, and a connection between said eccentric and plunger for operating the latter.

8. In a pump of the character described, the combination with the pump-cylinder, the reciprocating plunger and a rotary valve for controlling the flow of liquid to and from the pump-cylinder, of a driving-shaft having a worm thereon, a worm-wheel engaging said worm, a mutilated gear and an eccentric rotatable with the worm, a mutilated pinion connected to the valve and arranged to engage said gear and connections between said eccentric and plunger for operating the latter.

In testimony whereof I affix my signature in presence of two witnesses.

RUSSELL HUFF.

Witnesses.
 F. E. PAINE, Jr.,
 ALLEN LOOMIS.